United States Patent Office 3,506,429
Patented Apr. 14, 1970

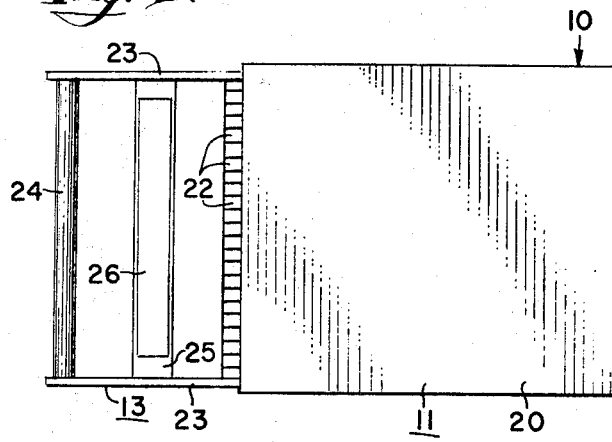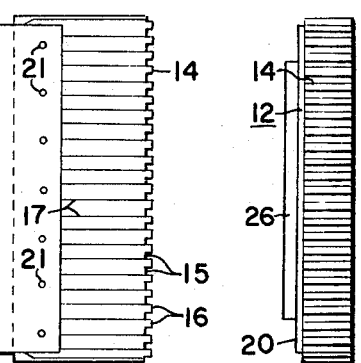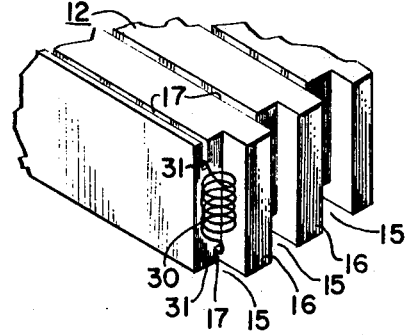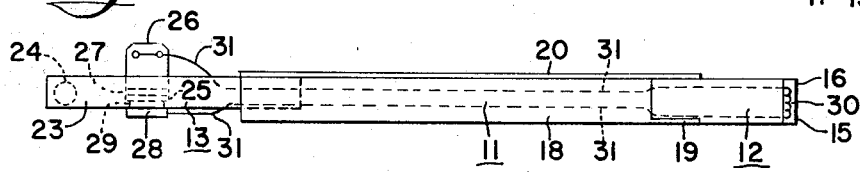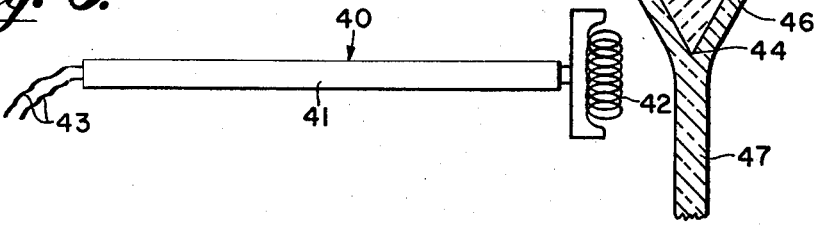
INVENTOR.
KENNETH T. OVERMAN
BY
ATTORNEY

3,506,429
APPARATUS FOR IMPROVING THICKNESS UNIFORMITY IN DOWN DRAWN GLASS SHEET
Kenneth T. Overman, Painted Post, N.Y., assignor to Corning Glass Works, Corning, N.Y., a corporation of New York
Filed Jan. 3, 1967, Ser. No. 606,870
Int. Cl. C03b 17/00
U.S. Cl. 65—203         5 Claims

ABSTRACT OF THE DISCLOSURE

Electrically powered apparatus for providing uniform thickness across the width of downwardly-drawn glass sheet. One or more independently controlled electric heater elements are positioned within close proximity to the downwardly-drawn glass sheet, adjacent the point of draw, to obtain a desired temperature profile and thereby provide a uniform glass thickness.

BACKGROUND OF THE INVENTION

When molten glass is drawn into glass sheet, the glass is stretched from an initial thickness to a final thickness. In the overflow-downdraw process wherein molten glass flows downwardly along opposed converging sides of a forming member and is withdrawn as a single sheet from the root or bottom edge thereof, the initial thickness would be measured close to such bottom edge, which represents the "point of draw." The uniformity of thickness of the final sheet is determined during the stretching process from the point of draw, by both the uniformity of the initial thickness, and by the uniformity of the glass viscosity. That is, a given thickness variation in the final sheet may be the result of inaccurate metering, imperfections in the glass-contacting sides of the forming member, or by imperfections in the temperature environment of the glass which causes imperfections in the viscosity profile of the glass flowing downwardly along the forming member.

We have found that a thickness defect, such as a streak in the glass, which does not change its position or magnitude with time, may be corrected by changing the viscosity of the glass as it is being stretched to its final thickness. Virtually any thickness defect may be so corrected, whether it be caused by the improper metering, poor forming surface, or undesirable thermal conditions, as long as the defect is constant with time. It is important, however, that apparatus be utilized which provides precise incremental or individual thermal control over a plurality of narrow longitudinal bands which extend parallel to the direction of draw. In addition, the apparatus must have sufficient portability and adjustability so as to be positionable in close proximity to the drawn glass sheet, adjacent the point of draw, so as to affect its viscosity during the stretching or attenuation which is occasioned as the sheet leaves the point of draw.

DESCRIPTION OF THE PRIOR ART

Various attempts have been made in the past to provide sheet glass with uniform thickness. As shown in U.S. Patent No. 1,829,641, water cooled members were utilized in the downdraw sheet drawing process to cool border sections of the converging streams so that when the sheet leaves the lower end of the forming member they would be rigid enough to overcome the natural tendency of the sheet to narrow. Patent No. 3,223,502 discloses the use of electrical heater segments directed toward a molten bath in an updraw process so as to affect the viscosity of the glass going into the gather and the sheet, which results in a selective change in glass thickness.

The cooling member, however, did not provide uniform thickness across the width of the sheet glass, but was merely utilized to prevent the narrowing or necking-in of the edges of the downwardly drawn sheet. The electric heater segments of the updraw process, on the other hand, were part of a fixed or rigid structure within the glass drawing apparatus and accordingly had no versatility or mobility. Further, the heater elements were in axial alignment with each other with their longitudinal axis extending transversely across the molten bath from which the sheet was drawn. Since the elements were directed toward the bath, wide bands of the surface thereof were affected by the various elements, and accordingly precise selective control could not be obtained. Further, an extended time delay was occasioned between the initial application of heat to the molten bath and the resulting effect produced on the drawn glass sheet.

SUMMARY OF THE INVENTION

Briefly, this invention relates to novel electrically powered apparatus for providing a uniform temperature profile across the width of glass adjacent its point of draw, so as to control the viscosity of the glass as it is being stretched to final thickness, and thereby provide uniformity of thickness in the final sheet. The apparatus includes one or more individually controlled electrical resistance elements or heaters which are preferably in the form of a cylindrical coil. The longitudinal axis of each such coil is oriented parallel to the line of draw of the glass sheet, and a plurality of such individually controlled heaters are preferaby positioned across the width of the sheet with the longitudinal axes of such elements parallel to each other and in the direction of the draw. Accordingly, each element, which may be isolated from its adjacent element, only acts upon and controls the viscosity of a narrow longitudinal band of glass sheet as it flows by such element. Therefore it is possible to accurately control the temperature profile, and accordingly the viscosity profile, across the entire width of the glass sheet to provide a uniform thickness thereacross as the glass is being stretched from its initial thickness at the point of draw to its final thickness.

The apparatus is further characterized in its portability or flexibility of positionment, so as to achieve optimum response in the shortest possible time. Unlike the prior art devices which were of a fixed character and directed heat in broad segments across the molten bath, the instant invention not only obtains relatively fast response in the glass sheet, but also more accurate or precise control is obtainable to compensate for differential temperature variances across the width of the sheet. In addition, the improved apparatus of the instant invention provides flexibility by permitting the distance between the heater probe and the glass to be changed, in order to increase or decrease the width of its effect, or the energy input of the heater can be changed to increase or decrease the magnitude of the effect.

It thus has been an object of the present invention to provide an improved electrically powered apparatus for use in conjunction with downdraw sheet forming apparatus, wherein the electrically powered apparatus is positioned adjacent the root of the sheet forming apparatus to provide a desired temperature profile, and accordingly uniform thickness across the width of the sheet as it is stretched from the point of draw to its final thickness.

A further object of the invention has been to provide, in conjunction with downdraw sheet glass forming apparatus, an improved electrically powered apparatus having a plurality of individually controlled parallel heating coils having their longitudinal axes parallel to the direction of draw and being positioned in spaced apart relation across the width of the drawn sheet adjacent the point of draw to provide uniform thickness.

These and other objects of the invention will be apparent to those skilled in the art from the following disclosure and accompanying drawings in which:

BRIEF DESCRIPTION OF THE DRAWING

FIG. 1 is a top plan view of a preferred apparatus embodying the invention.

FIG. 2 is a front elevational view of the preferred embodiment, but oriented on its side so as to be in alignment with FIG. 1.

FIG. 3 is a fragmental perspective view of the preferred embodiment of FIG. 1, showing the front face in its correct orientation with an electrical resistance element or heater shown in position.

FIGURE 4 is a side elevational view of the apparatus shown in FIG. 1.

FIG. 5 is a side elevational view of a further embodiment of the invention shown in position adjacent the root or point of draw of a downflow sheet glass forming member.

DESCRIPTION OF THE PREFERRED EMBODIMENTS

Referring now to the drawing and particularly FIGS. 1 through 4, an electrically powered heating apparatus 10 is shown having a holder or housing body portion 11, a forward refractory head portion 12, and a rearward support or mounting portion 13. The refractory head portion 12, which may be made of any suitable material such as fused alumina, has a forward face 14 provided with a plurality of vertically-extending recessed portions 15, which are transversely spaced apart by separator block portions 16. A plurality of grooves 17 are formed in both the upper and lower surfaces of the refractory head 12 in such a manner so that each recessed portion 15 has one upper and one lower groove communicating therewith.

The refractory head portion is retained by the forward end of the housing body portion 11. The body portion 11 may be in the form of an open-ended box, and comprises a hollow channel portion 18 having a forward lip or flange 19, and a cover member 20 overlying the channel portion. The rearward end of the refractory head 12 is sandwiched between the forward end of the cover member 20 and flange 19, and is secured in place by means of a plurality of fasteners such as pins, bolts or screws 21. A plurality of insulating tube portions 22, are retained by housing 11 in parallel relationship along the longitudinal extent of channel portion 18.

The rearward support or mounting portion 13 has a pair of support bars 23 secured to the sidewalls of channel portion 18. A tie bar 24 connects the outer ends of support bars 23. A spacer bar 25 extends between the support bars 23 and has control connecting means including a terminal strip 26 mounted thereon, with suitable insulation 27 therebetween. Also a copper bus bar 28 is mounted on the lower side of the spacer bar with insulation 29 therebetween.

Each recessed portion 15 is provided with an electrical resistance element or heater coil 30, such as shown in the first recessed portion of FIGS. 3 and 4. Each resistance element coil or winding 30 is provided with a pair of leads 31 which extend rearwardly within grooves 17 and through a separate insulating tube portion, so that the upper lead may be connected to corresponding terminals of terminal strip 26, and the lower lead connected to bus bar 28. For simplicity of representation, grooves 17 have been omitted from FIG. 2, and the heater coil 30 and leads 31 have been omitted from both FIGS. 1 and 2. Although the coil 30 and leads 31 have been shown only in the first recessed portion of FIG. 3, it will be understood that each recessed portion 15 is, in a like manner, provided with an individually controlled electrical resistance element or heater coil 30. Suitable instrumentation may be connected to the terminal strip as desired for either manual or automatic operation. Further, if desired each lead 31 may be in the form of a double lead, for either safety purposes or to reduce the energy loss therealong.

Referring now to the further embodiment shown in FIG. 5, a single head apparatus 40 is shown in the environment of its intended use, that is, in combination with downdraw sheet glass forming apparatus. The single head apparatus comprises a body portion 41 of multibore ceramic tubing, a resistant winding head portion 42 and a plurality of leads 43 extending from said resistant winding through said body portion and to a suitable source of control and power. As shown, the winding element 42 is positioned adjacent the root or point of draw 44 of a downdraw forming member 45, having molten glass 46 flowing along opposite sides thereof which is withdrawn from the root as a single sheet of glass 47. The single head apparatus is easily portable and may be readily adjustably positioned adjacent the point of draw so that not only may the lateral distance between the winding 42 and point of draw be adjusted, but also the vertical positionment may be varied as desired.

Although the point of draw has been utilized as a reference point, the heating of the glass sheet may take place slightly above this point, as on the side of the forming member 45, or it might take place slightly below the point of draw in the area where the sheet is being stretched during cooling to its final thickness. It should be noted that the longitudinal axis of the winding or heating coil 42 is shown parallel to the direction of draw of the sheet 47, in the same manner as the coils of the multiple head apparatus 10, which is similarly positioned adjacent the point of draw. However, a plurality of the single head apparatuses 40 may be positioned across the width of the sheet 47 as may be needed to control surface defects noted therein, with the longitudinal axes of the heating elements preferably being arranged in a vertical orientation so that they are not only parallel to themselves but also to the line of draw of the sheet 47. The heater elements may be in a form other than the right cylindrical coil shown, and such coils may, if desired, be positioned in various orientations with respect to the direction of draw.

Although the now preferred embodiments have been set forth in detail, it will be appreciated by those skilled in the art that various changes and modifications may be made thereto without departing from the spirit and scope of the invention.

I claim:

1. In apparatus for downdraw forming sheet glass including a forming member having downwardly converging sidewall portions for flowing streams of molten glass therealong which meet at a bottom root portion, forming a point of draw, from which a single sheet of glass is withdrawn, an improved apparatus for providing thickness uniformity across the width of the sheet comprising, a body portion, a head portion including a plurality of recessed portions, an electrical resistance winding positioned in each said recessed portion, leads extending from each said winding through said body portion for the individual control of each said winding, said electrical resistance windings being positioned adjacent the point of draw of said forming member so as to affect the viscosity of the sheet as it is stretched from the point of draw to final thickness, and a longitudinal axis of each said resistance winding being oriented substantially parallel to the direction of draw of the glass sheet from the forming member.

2. In apparatus for downdraw forming sheet glass including a forming member having downwardly converging sidewall portions for flowing streams of molten glass therealong which meet at a bottom root portion from which a single sheet of glass is withdrawn, an improved apparatus for providing thickness uniformity across the width of the sheet comprising, a body portion, a head portion in the form of a refractory member retained by said body portion, a plurality of vertically extending recessed portions formed in a forward face of said refractory member, a separator block extending between each said recessed portion, an electrical resistance winding positioned within each of said recessed portions, and each said resistance winding having a longitudinal axis substantially parallel to its adjacent winding and to the direction of draw of the glass sheet from the forming member.

3. Apparatus as defined in claim 1 wherein a pair of grooves is formed in said head portion for each said recessed portion, an insulating tube portion is retained by said body portion for each said recessed portion, and each lead connected to each said electrical resistant winding is directed through a separate groove formed in said head portion and separate tube portion to control connecting means positioned rearwardly of said body portion.

4. Apparatus as defined in claim 3 wherein a support structure is connected to and extends rearwardly of said body portion, and said control connecting means is retained by said support structure and comprises a terminal strip and bus bar insulatably mounted thereon in spaced apart relationship.

5. Apparatus as defined in claim 2 wherein a plurality of grooves are formed in an upper and lower surface of said refractory member in such a manner so that an upper and lower groove communicates with each said recessed portion.

References Cited

UNITED STATES PATENTS

| | | | |
|---|---|---|---|
| 1,753,768 | 4/1930 | Blair | 65—203 X |
| 2,774,190 | 12/1956 | Atkeson | 65—95 |

ARTHUR D. KELLOGG, Primary Examiner

U.S. Cl. X.R.

65—128, 326, 350